(12) United States Patent
Stenneth

(10) Patent No.: US 11,194,846 B2
(45) Date of Patent: Dec. 7, 2021

(54) METHOD AND APPARATUS FOR PROVIDING AUTOMATED GENERATION OF PARKING RESTRICTION DATA USING MACHINE LEARNING

(71) Applicant: HERE Global B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 778 days.

(21) Appl. No.: 15/362,228

(22) Filed: Nov. 28, 2016

(65) Prior Publication Data

US 2018/0150764 A1    May 31, 2018

(51) Int. Cl.
*G06F 16/29* (2019.01)
*G06N 20/00* (2019.01)
(Continued)

(52) U.S. Cl.
CPC .............. *G06F 16/29* (2019.01); *G01C 21/00* (2013.01); *G06N 20/00* (2019.01); *G06Q 10/04* (2013.01); *G06Q 50/30* (2013.01)

(58) Field of Classification Search
CPC .......... G08G 1/147; G08G 1/14; G08G 1/148; G08G 1/0129; G08G 1/0112; H04L 67/12;
(Continued)

(56) References Cited

U.S. PATENT DOCUMENTS 8,963,740 B2 *  2/2015  Koukoumidis ........ G08G 1/141
                                                    340/932.2
9,123,245 B2    9/2015  Gruteser et al.
(Continued)

FOREIGN PATENT DOCUMENTS

CN    104134368 A    11/2014
CN    105526940 A    4/2016

OTHER PUBLICATIONS

Richter, F., et al., "Temporal and spatial clustering for a parking prediction service," 2014, IEEE 26th International Conference on Tools with Artificial Intelligence, pp. 278-282 (Year: 2014).*

(Continued)

*Primary Examiner* — Miranda M Huang
*Assistant Examiner* — Catherine F Lee
(74) *Attorney, Agent, or Firm* — Ditthavong, Steiner & Mlotkowski

(57) ABSTRACT

An approach is provided for generating parking restriction data using a machine learning model. The approach involves determining a plurality of classification features associated with a set of labeled road links. Each of the labeled road links is labeled with a parking restriction label that indicates a parking restriction status of said each of the labeled road links. The approach also involves training the machine learning model to classify an unlabeled road link of the geographic database using the plurality of classification features. The approach further involves determining the plurality of classification features for the unlabeled road link. The approach further involves processing the plurality of classification features for the unlabeled road link using the trained machine learning model to associate an assigned parking restriction label to the unlabeled road link. The approach further involves storing the assigned parking restriction label as the parking restriction data.

19 Claims, 12 Drawing Sheets

(51) Int. Cl.
G06Q 10/04 (2012.01)
G01C 21/00 (2006.01)
G06Q 50/30 (2012.01)

(58) Field of Classification Search
CPC ........ G06N 20/00; G06N 3/08; G06N 3/0454; H04W 4/44; H04W 4/024; H04W 4/029; G06Q 50/30; G06Q 2240/00; G06Q 10/04; G06F 16/29; G01C 21/00
See application file for complete search history.

(56) References Cited

U.S. PATENT DOCUMENTS

| | | | |
|---|---|---|---|
| 2002/0161520 | A1 | 10/2002 | Dutta et al. |
| 2008/0048885 | A1* | 2/2008 | Quinn .................... G08G 1/143 340/932.2 |
| 2010/0318290 | A1* | 12/2010 | Kaplan .................. G01C 21/30 701/426 |
| 2012/0161986 | A1* | 6/2012 | Amir .................. G01C 21/3685 340/932.2 |
| 2012/0284213 | A1* | 11/2012 | Lin .......................... G06N 3/08 706/12 |
| 2013/0046456 | A1* | 2/2013 | Scofield ............. G01C 21/3453 701/117 |

OTHER PUBLICATIONS

Coric, V., et al., "Crowdsensing Maps of On-Street Parking Spaces," 2013, IEEE International Conference on Distributed Computing in Sensor Systems, pp. 115-122 (Year: 2013).*

Mathur, S., et al., "ParkNet: Drive-by Sensing of Road-Side Parking Statistics," Jun. 2010, MobiSys '10, ACM, 14 pages (Year: 2010).*

Chen et al., "Urban land use mapping using high resolution SAR data based on density analysis and contextual information," 2012, Canadian Journal of Remote sensing, vol. 38, No. 6, pp. 738-749 (Year: 2012).*

Hu et al., "Automatic Road Extraction from Dense Urban Area by Integrated Processing of High Resolution Imagery and LIDAR Data," 2004, International Archives of Photogrammetry, Remote Sensing and Spatial Information Sciences, 5 pages (Year: 2004).*

Coric et al., "Crowdsensing Maps of On-Street Parking Spaces", DCOSS '13 Proceedings of the 2013 IEEE International Conference on Distributed Computing in Sensor Systems, May 20, 2013, 8 pages.

Bock et al., Abstract of "Learning On-street Parking Maps From Position Information of Parked Vehicles", May 15, 2016, available at http://link.springer.com/chapter/10.1007/978-3-319-33783-8_17, pp. 1-4.

* cited by examiner

METHOD AND APPARATUS FOR PROVIDING AUTOMATED GENERATION OF PARKING RESTRICTION DATA USING MACHINE LEARNING

BACKGROUND

Providing street parking navigation options is an area of interest for navigation service providers and original equipment manufacturers (OEMs). To provide such options, service providers and OEMs can maintain a geographic database of parking restrictions along various road links. However, populating the geographic database with parking restriction data often is a manual and resource intensive process. As a result, a typical geographic database may have parking restriction data on only a fraction of the road links stored in the database.

SOME EXAMPLE EMBODIMENTS

Therefore, there is a need for an approach for automated labeling of road links with parking restrictions.

According to one embodiment, a method for generating parking restriction data using a machine learning model, comprises determining a plurality of classification features associated with a set of labeled road links. Each of the labeled road links is labeled with a parking restriction label that indicates a parking restriction status of said each of the labeled road links. The method also comprises training the machine learning model to classify an unlabeled road link of the geographic database using the plurality of classification features. The method further comprises determining the plurality of classification features for the unlabeled road link. The method further comprises processing the plurality of classification features for the unlabeled road link using the trained machine learning model to associate an assigned parking restriction label to the unlabeled road link. The method further comprises storing the assigned parking restriction label as the parking restriction data in a parking restrictions database.

According to another embodiment, an apparatus for generating parking restriction data using a machine learning model comprises at least one processor, and at least one memory including computer program code for one or more computer programs, the at least one memory and the computer program code configured to, with the at least one processor, cause, at least in part, the apparatus to determine a plurality of classification features associated with a set of labeled road links. Each of the labeled road links is labeled with a parking restriction label that indicates a parking restriction status of said each of the labeled road links. The apparatus is also caused to train the machine learning model to classify an unlabeled road link of the geographic database using the plurality of classification features. The apparatus is further caused to determine the plurality of classification features for the unlabeled road link. The apparatus is further caused to process the plurality of classification features for the unlabeled road link using the trained machine learning model to associate an assigned parking restriction label to the unlabeled road link. The apparatus is further caused to store the assigned parking restriction label as the parking restriction data in a parking restrictions database.

According to another embodiment, a non-transitory computer-readable storage medium carries one or more sequences of one or more instructions which, when executed by one or more processors, cause, at least in part, an apparatus to determine a plurality of classification features associated with a set of labeled road links. Each of the labeled road links is labeled with a parking restriction label that indicates a parking restriction status of said each of the labeled road links. The apparatus is also caused to train the machine learning model to classify an unlabeled road link of the geographic database using the plurality of classification features. The apparatus is further caused to determine the plurality of classification features for the unlabeled road link. The apparatus is further caused to process the plurality of classification features for the unlabeled road link using the trained machine learning model to associate an assigned parking restriction label to the unlabeled road link. The apparatus is further caused to store the assigned parking restriction label as the parking restriction data in a parking restrictions database.

A method for generating parking restriction data using a machine learning model, comprises determining a plurality of classification features associated with a set of labeled road links. Each of the labeled road links is labeled with a parking subtype label indicating a subtype of the parking. The method also comprises training the machine learning model to classify an unlabeled road link of the geographic database using the plurality of classification features. The unlabeled road link is unlabeled at least with respect to the parking subtype label. The method further comprises determining the plurality of classification features for the unlabeled road link. The method further comprises processing the plurality of classification features for the unlabeled road link using the trained machine learning model to associate an assigned parking subtype label to the unlabeled road link. The method further comprises storing the assigned parking subtype label as the parking restriction data.

According to another embodiment, an apparatus for generating parking restriction data using a machine learning model comprises at least one processor, and at least one memory including computer program code for one or more computer programs, the at least one memory and the computer program code configured to, with the at least one processor, cause, at least in part, the apparatus to determine a plurality of classification features associated with a set of labeled road links. Each of the labeled road links is labeled with a parking subtype label indicating a subtype of the parking. The apparatus is further caused to train the machine learning model to classify an unlabeled road link of the geographic database using the plurality of classification features. The unlabeled road link is unlabeled at least with respect to the parking subtype label. The apparatus is further caused to determine the plurality of classification features for the unlabeled road link. The apparatus is further caused to process the plurality of classification features for the unlabeled road link using the trained machine learning model to associate an assigned parking subtype label to the unlabeled road link. The apparatus is further caused to store the assigned parking subtype label as the parking restriction data.

According to another embodiment, a non-transitory computer-readable storage medium carries one or more sequences of one or more instructions which, when executed by one or more processors, cause, at least in part, an apparatus to determine a plurality of classification features associated with a set of labeled road links. Each of the labeled road links is labeled with a parking subtype label indicating a subtype of the parking. The apparatus is further caused to train the machine learning model to classify an unlabeled road link of the geographic database using the plurality of classification features. The unlabeled road link is unlabeled at least with respect to the parking subtype label.

The apparatus is further caused to determine the plurality of classification features for the unlabeled road link. The apparatus is further caused to process the plurality of classification features for the unlabeled road link using the trained machine learning model to associate an assigned parking subtype label to the unlabeled road link. The apparatus is further caused to store the assigned legal parking type label as the parking restriction data.

According to another embodiment, a method for generating parking restriction data using a machine learning model, comprises querying a geographic database for a set of road links that are unlabeled with respect to a parking restriction label. The method also comprises automatically labeling the set of road links with a respectively assigned parking restriction label using a machine learning model. The machine learning model is trained to classify the set of road links using a plurality of classification features determined from another set of road links that were previously labeled with a known parking restriction label. The method further comprises storing the respectively assigned parking restriction label in the geographic database as the parking restriction data.

According to another embodiment, an apparatus for generating parking restriction data using a machine learning model comprises at least one processor, and at least one memory including computer program code for one or more computer programs, the at least one memory and the computer program code configured to, with the at least one processor, cause, at least in part, the apparatus to query a geographic database for a set of road links that are unlabeled with respect to a parking restriction label. The apparatus is also caused to automatically label the set of road links with a respectively assigned parking restriction label using a machine learning model. The machine learning model is trained to classify the set of road links using a plurality of classification features determined from another set of road links that were previously labeled with a known parking restriction label. The apparatus is further caused to store the respectively assigned parking restriction label in the geographic database as the parking restriction data.

According to another embodiment, a non-transitory computer-readable storage medium carries one or more sequences of one or more instructions which, when executed by one or more processors, cause, at least in part, an apparatus to query a geographic database for a set of road links that are unlabeled with respect to a parking restriction label. The apparatus is also caused to automatically label the set of road links with a respectively assigned parking restriction label using a machine learning model. The machine learning model is trained to classify the set of road links using a plurality of classification features determined from another set of road links that were previously labeled with a known parking restriction label. The apparatus is further caused to store the respectively assigned parking restriction label in the geographic database as the parking restriction data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing automated generation of parking restriction data using machine learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
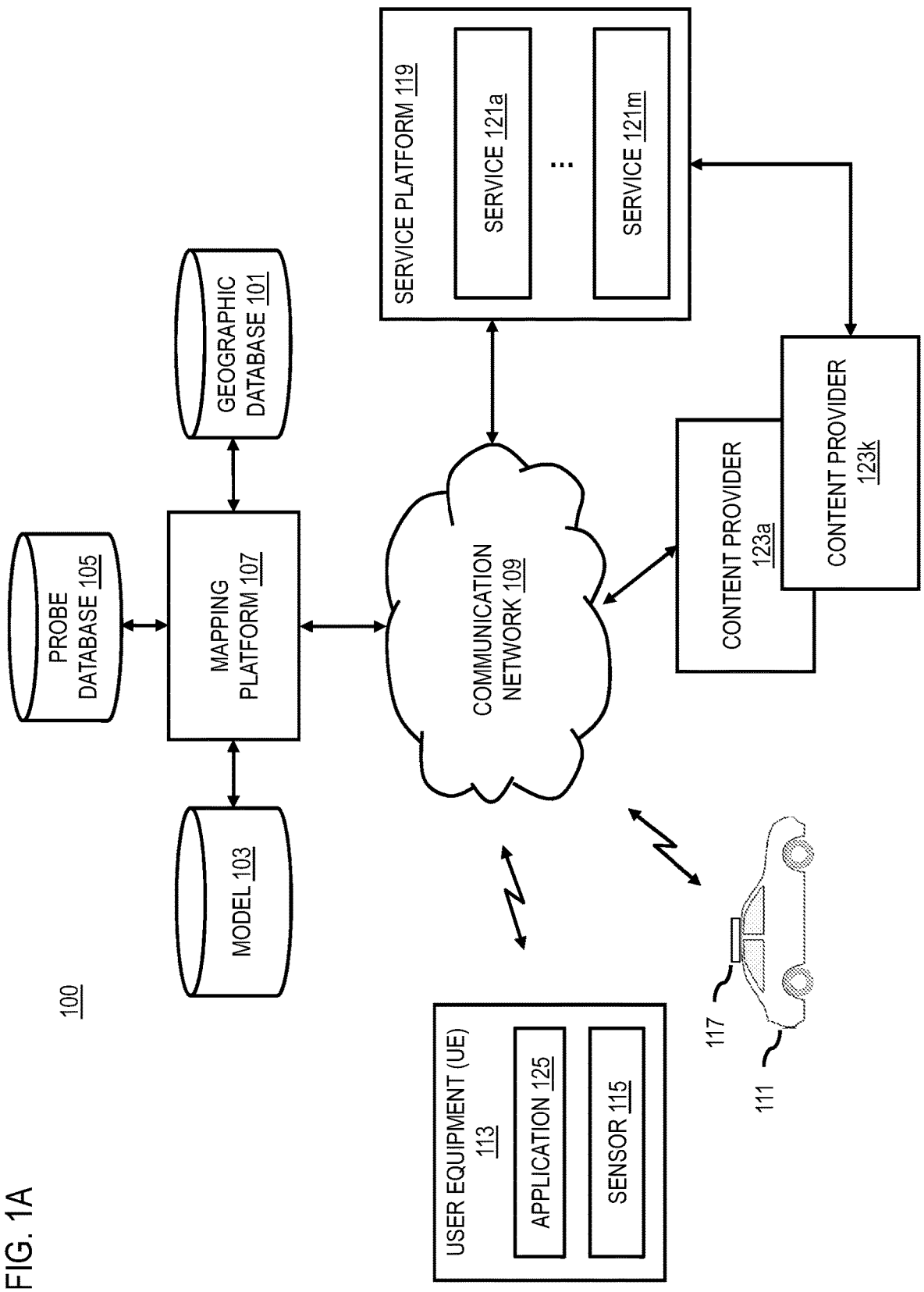
FIG. 1A is a diagram of a system for providing automated generation of parking restriction data using machine learning, according to one embodiment.

FIG. 1A is a diagram of a system for providing automated generation of parking restriction data using machine learning, according to one embodiment. As discussed above, providing street parking navigation options is an area of interest for service providers, original equipment manufacturers (OEMs), and/other navigation related companies. For example, advanced navigation systems are now expected to incorporate street parking availability and/or parking restrictions into many of their functions. When traveling from an origin to a destination, for instance, the systems are expected to automatically determine parking availability and/or parking restrictions and route users along roads (e.g., represented by road links in a geographic database 101) that provide a high chance of finding street parking at or near the destination.

However, the problem is that parking restrictions can vary from road link to road link. For example, differences in parking restrictions mean, for instance, that: (1) not all road links are legal to park all the time, (2) some road links are always illegal to park, (3) some road links are only legal during certain times of the day, etc. Traditionally, gathering parking restriction data has been a manual and resource-intensive effort that often is based on traveling the route to sense or otherwise determine indications of parking restrictions (e.g., signs, lane markings, road geometry, etc.). For example, one traditional strategy for gathering parking restriction data is to walk/drive around physically on the road and manually mark road links with parking restrictions or to use parking signs as a proxy. However, parking signs can vary across different areas, regions, countries, etc., and some roads are not updated with the correct parking sign. Therefore, it can be challenging and time consuming to walk/drive all the road links in the geographic database 101 and then manually label them with parking restriction labels.

Because of the level of effort needed to generate parking restriction data, service providers often find that a typical geographic database 101 (e.g., which can store up to millions of road links) have parking restriction data defined for only a small percentage of all stored road links. For example, an analysis of a typical example geographic database 101 may indicate that for any given city only a relatively small percentage (e.g., <20%) of the road links have parking restrictions defined. Ideally, 100% of the road links in a city should have a parking restriction label, but the level of manual effort required to populate parking restriction data for all road links can be cost prohibitive and time consuming. Moreover, as new road links are added or as parking restrictions change for existing road links in the geographic database 101, updating existing parking restriction data can be equally burdensome in terms of resources and time. This problem is further exacerbated as the geographic database 101 increases in coverage scale or as the granularity of each road link increases (e.g., when a road link of the geographic database 101 represents a smaller or finer segment of a corresponding roadway). Accordingly, an automated procedure is needed to determine street parking restrictions on a road link and then label the link with the determined street parking restriction in the geographic database 101.

To address this problem, a system 100 of FIG. 1A introduces a capability to use machine learning (e.g., Bayes Net, Random Forest, Decision Trees, etc.) with a constructed set of classification features to train a machine learning model 103 to learn the correct parking restriction label to give to a road link (e.g., an unlabeled road link with no assigned parking restriction label in the geographic database 101). By way of example and not limitation, the classification features can include: (1) a functional class of the road link, (2) average parking availability at the road link as determined from probe data, (3) an average number of time epochs for which a road link has parking availability, etc. In one embodiment, the trained machine learning model 103 receives values of the classification features determined for a road link (e.g., a previously unlabeled road link) as an input, and then outputs a parking restriction label for the road link. By way of example, the parking restriction label can include, but is not limited to: (1) a legal parking label indicating that parking is legal on the road link for at least some time period; (2) an illegal parking label indicating that parking is always illegal on the road link; and/or (3) a purely legal parking label indicating that parking is legal on the road link at all times. In one embodiment, the system 100 can also provide additional sub-labels or subtypes for a parking restriction label. For example, under a general parking restriction label that indicates parking is legal, the model 103 can also label the road link to indicate the following subtypes of parking: (1) a free parking label indicating that parking is at no cost on the road link; (2) a permitted parking label indicating that a parking permit is required to park legally on a road link; (3) a paid parking label indicating that a payment is required to park on a road link (e.g., via a parking meter).

In other words, the machine learning model 103 considers a set of classification of features and parking restrictions labels, and then learns how to assign parking restriction labels to road links. As noted above, the parking restriction labels can include: (1) a legal parking label, (2) an illegal parking label, and/or (3) a purely legal parking label. In one embodiment, the system 100 employs a set of features that are used to train the machine learning model 103 on how to recognize street parking restrictions. By way of example, any machine learning model 103 known in the art (e.g., Bayes Net, Decision Trees, etc.) can be used according to the various embodiments described herein.

In one embodiment, the set of classification feature includes, but is not limited to, a functional class of the road link. By way of example, a functional class is a grouping of highways, roads, streets, etc. by the role of the roadway in moving vehicles in a road network. In addition, a functional class can indicate a speed, capacity, design, relationship to other roadways, etc. associated with a road link. Examples of functional classes include, but are not limited to: (1) principal arterial roadways (e.g., interstates, freeways, expressways, etc.); (2) minor arterial roadways; (3) collector roadways (e.g., major collector, minor collector, etc.); and/or (4) local roadways. In one embodiment, each functional class is identified according to a number (e.g., 1=principal arterial, 2=minor arterial, 3=collector, and 4=local). Generally, illegal parking road links are associated with higher functional class roads. For example, on a functional class 1 road (e.g., a highway), no parking is allowed. Likewise, parking is illegal on many functional class 2 roads. Generally, parking is not illegal on most function class 4 roads. It is noted that these relationship are provided only as examples. The machine learning model 103 will determine the relationship to apply after training on ground truth data.

In one embodiment, the set of classification features includes, but is not limited to, an average historical parking availability per time epoch. In one embodiment, the feature is computed by first dividing time into epochs of equal size. For example, an epoch size can be 15 minutes. Thus for each day, there are 96 epochs, and for each week, there are 96×7 (252) epochs. For each epoch, the system 100 searches a probe database 105 to determine probe traces that start or end on the road link during the epoch. A probe trace, for instance, is a set of probe reports that are ordered by time for the same probe (e.g., same probe vehicle or device). A probe trace that starts on the link indicates that a parking spot may be available on the road link because the probe vehicle is assumed to have departed from a parking spot. Conversely, if a probe trace ends on the road link, the system 100 can infer that a parking space located on the road link was occupied. In one embodiment, from the data on these available and occupied parking statistics within the epoch, the system 100 can compute the historical availability for the epoch and for the road link. In one embodiment, the system 100 can average the determined parking availability across all epochs to determine value for the feature. It is noted that in some embodiments, the system 100 need not divide the probe data according to time epochs. Instead, the system 100 can process the probe data for the road link as one batch. By way of example, a road link that is illegal for parking generally will have very low average historical parking availability, while a link that is legal for parking will have higher average historical average historical availability.

In one embodiment, the set of classification features includes, but is not limited to, an average number of epochs with known parking availability. This feature is an indication of whether parking availability information is known or otherwise defined for a given road link, and is not an indication of the underlying parking availability value itself. For example, parking availability information can be "known" as long as a value for parking availability has been determined (e.g., whether 0 or otherwise) for a road link. In one embodiment, the average number of epochs with historical parking availability is based on a count on the number of epochs per road link with known parking availability as determined, for instance, from the probe data as described above. For example, if for a given link only 3 of the 15-minute time epochs had parking availability that is defined with some value, then the value of this feature for this road link is 3. Generally, this feature varies according to whether a road link is labeled as legal, illegal, or purely legal for parking.

In one embodiment, given a set of classification features (e.g., the classification features discussed above, or any other features related to the road link such as nearby point-of-interests, location, speed limit, number of lanes, etc.), the system 100 can train the machine learning model using a training dataset comprising road link records that were previously labeled with parking restriction information that is accepted as ground truth data. For example, the ground truth or training data may be road links that have been assigned parking restriction labels using traditional manual processes. The assigned parking restriction labels and corresponding classification features of the labeled road links of the training data can then be fed into the machine learning model 103 for training. As noted above, any machine learning model known in the art may be used according to the various embodiments described herein.

Table 1 below is an example set of training data in which the classification features include: the number of epochs with known parking availability, the number of probe observed in a particular epoch, the historical parking availability, and the functional class of the road link.

TABLE 1

| Ground Truth Label | Number of Epochs with Availability | Number of Probe Observations per Epoch | Parking Availability per Epoch | Functional Class |
|---|---|---|---|---|
| Illegal | 19 | 2.156 | 0.0228 | 4 |
| Illegal | 11 | 2.091 | 0.00585 | 3 |
| Purely Legal | 16 | 2 | 0 | 5 |
| Purely Legal | 10 | 3 | 0 | 5 |
| Legal | 6 | 2 | 0 | 5 |
| Legal | 8 | 2 | 0 | 5 |

In one embodiment, different machine learning models (e.g., Bayes Net, Decision Trees, etc.) may be trained, so that the model with the highest accuracy can be selected as the machine learning model 103 that is used by the system 100. In one embodiment, model accuracy can be assessed by cross validating the trained machine learning models against another set of road links labeled with known parking restriction labels that is accepted as ground truth. This validation dataset may be a different set of labeled data than the training data set, or may be segmented from the training dataset. For example, the labeled road link data designated for training can be divided into a first portion that is used to train the machine learning models, and then a second portion used for validation. In either case, to validate or determine the accuracy of a model, the trained machine learning models can process the validation dataset to assign parking restriction labels. In one embodiment, the system 100 uses a 10-fold cross validation as an evaluation strategy. The assigned parking restriction labels can then be compared against the parking restriction labels designated as ground truth. In one embodiment, the accuracy of a model is calculated as a percent of the assigned parking restriction labels that match the corresponding ground truth parking restriction labels. In addition or alternatively, other validation parameters such as true positive rates, false positive rates, precision, recall, F-score, etc. can be used to evaluate or select from among different machine learning models.

In one embodiment, after training and optionally validation, the machine learning model 103 can be used to label road links in the geographic database 101 that do not have parking restriction labels or for which new parking restriction labels are to be assigned. The system 100, for instance, can determine values of the classification features used for training the machine learning model 103 for each of the road links to be labeled. For example, to determine a functional class of the unlabeled road links, the system 100 can query the geographic database 101 and/or any other database that may store such information (e.g., third party databases such as a governmental authority database) for the functional class of a given road link. To determine classification features such as historical parking availability, epochs with parking availability, observed probes per epoch, and/or other probe data related features, the system 100 can query the probe database 105 for probe traces that originate from or terminate at a given road link. The features values are then calculated from the retrieved probe traces as discussed above.

In one embodiment, the classification feature values for each road link can then be fed into the trained machine learning model 103 to assign a parking restriction label. Because a machine learning model 103 is used, the system 100 can advantageously automate the parking restriction labeling process to generate parking labels without expending the resources or time to generate parking restriction data under traditional manual processes (e.g., physically walking/driving on the road links to manually determine parking restrictions). In one embodiment, the results of the machine learning classification can be presented in a user interface to an administrator of the geographic database 101. The user interface, for instance, can indicate which road links are to be labeled and/or which road links have been automatically labeled by the system 100. The user interface can the present options to initiate the automatic labeling of parking restrictions on unlabeled road links, or to confirm automatic labeling results.

As shown in FIG. 1A, the system 100 comprises a mapping platform 107 with connectivity to the geographic database 101, the machine learning model 103, the probe database 105, and a communication network 109. In one embodiment, the mapping platform 107 performs the processes for providing automated generation of parking restriction data using machine learning as discussed with respect to the various embodiments described herein.

In one embodiment, the system 100 also comprises one or more vehicles 111 and/or one or more user equipment 113 that act as probes traveling over a road network represented in the geographic database 101 as road links. Although the vehicle 111 is depicted as an automobile, it is contemplated that the vehicle 111 can be any type of transportation vehicle manned or unmanned (e.g., planes, aerial drone vehicles, motor cycles, boats, bicycles, etc.), and the UE 113 can be associated with any of the types of vehicles or a person or thing traveling through the road network of the geographic database 101. In one embodiment, the vehicle 111 and/or UE 113 is assigned a unique probe identifier (probe ID) for use in reporting or transmitting collected probe data for storage in the probe database 105. The vehicle 111 and UE 113, for instance, are part of a probe-based system for collecting probe data for monitoring traffic conditions in a transportation network.

In one embodiment, vehicle 111 and/or UE 113 is configured to report probe data as probe points, which are individual data records that record telemetry data collected at a point in time. In one embodiment, a probe point can include attributes such as a heading, a speed, a time, or a combination thereof of each of the plurality of devices. The list of attributes is provided by way of illustration and not limitation. It is contemplated that any combination of these attributes or other attributes may be recorded as a probe point. In one embodiment, the vehicle 111 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior. In one embodiment, the UE 101 may be configured with one or more sensors 115 for collecting the probe data. Similarly, the vehicle 111 may also be configured with sensors 117 for collecting probe data. By way of example, the sensors 115 and/or 117 may include location sensors (e.g., GPS), accelerometers, compass sensors, gyroscopes, altimeters, etc. In one embodiment, the trajectory data can be segmented into probe traces. Probe traces, for instance, are the pieces or portions of the probe data that can be separated into distinct segments. In one embodiment, probe traces are delimited by parking events at originating and ending of the probe trace. For example, where the probe trace started, it is likely that the probe vehicle just switched on its engine and is about to park. Similarly, wherein the probe trace ends, it is likely that the vehicle switched off its engine and parked. In addition or alternatively, a parking event may be detected when it is determined that a vehicle's engine is off, the key is outside of the car, the vehicle door is locked, and/or the like using onboard vehicle sensors. In one embodiment, these additional reporting measurements or attributes can also be used as a classification feature for generating parking restriction data.

In one embodiment, the probe points can be collected by the system 100 from the vehicle 111 and/or UEs 113 in real-time, in batches, continuously, or at any other frequency requested by the system 100 over, for instance, the communication network 109 for storage in the probe database 105 and/or processing by the mapping platform 107. The probe points also can be mapped to specific road links stored in the geographic database. In one embodiment, the system 100 (e.g., via the mapping platform 107) can generate probe traces from the probe points for an individual probe so that the probe traces represent a travel trajectory of the probe through the road network. As previously discussed, the mapping platform 107 can identify the road links corresponding to the origin and endpoint of a probe trace to determine parking availability and other related features for the corresponding road links.

In one embodiment, the system 100 includes one or more processes for automatically detecting if and where in a probe trace or trajectory a driver started searching for parking. By way of example, these processes can be used to determine values for one or more of the parking-related classification features (e.g., historical parking availability, parking availability per epoch, etc.).

In one embodiment, when a client vehicle 111 and/or UE 113 requests instructions to find parking in a given area or location, a visual representation of a route or map spanning streets or road links of the relevant can be presented in a user interface presented to the end user. The user interface can also present representations of the parking restrictions labels assigned by the machine learning model 103 to the road links. For example, the system 100 may present the parking restriction labels as a map overlay that illustrates the parking restrictions for each depicted road link. In one embodiment, a service platform 119, one or more services 121a-121m (also collectively referred to as services 121), one or more content providers 123a-123k (also collectively referred to as content providers 123), or a combination thereof can respond to the requests for instructions to find parking or perform other navigation/map related functions.

By way of example, the UE 113 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

Also, the UE 113 and/or vehicle 111 may be configured with navigation applications 125 for interacting with the mapping platform 107, service platform 119, services 121, content providers 123, or a combination thereof. Through these services, the applications 125 may acquire parking restriction information, parking search instructions, navigation information, location information, mapping information, other data associated with the current location of the vehicle 111, a direction or movement of the vehicle along a roadway, etc.

As discussed above, the vehicle 111 and/or UE 113 may be configured with various sensors 115 or 117 for acquiring and/or generating probe data. For example, sensors 115 or 117 may be used as GPS receivers for interacting with one or more satellites to determine and track the current speed, position and location of a vehicle travelling along a roadway. In addition, the sensors 115 or 117 may gather tilt data (e.g., a degree of incline or decline of the vehicle during travel), motion data, light data, sound data, image data, weather data, temporal data and other data associated with the vehicle 111 and/or UE 113. Still further, the sensors 115 or 117 may detect local or transient network and/or wireless signals, such as those transmitted by nearby devices during navigation along a roadway. This may include, for example, network routers configured within a premise (e.g., home or business), another UE 113 or vehicle 111 or a communicable traffic system (e.g., traffic lights, traffic cameras, traffic signals, digital signage).

By way of example, the mapping platform 107 may be implemented as a cloud based service, hosted solution or the like for performing the above described functions. Alternatively, the mapping platform 17 may be directly integrated for processing data generated and/or provided by the service platform 119, services 121, content providers 123, and/or applications 125. Per this integration, the mapping platform 107 may perform client-side parking restriction labeling based on the machine learning model 103.

By way of example, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the mapping platform 107 communicates with other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
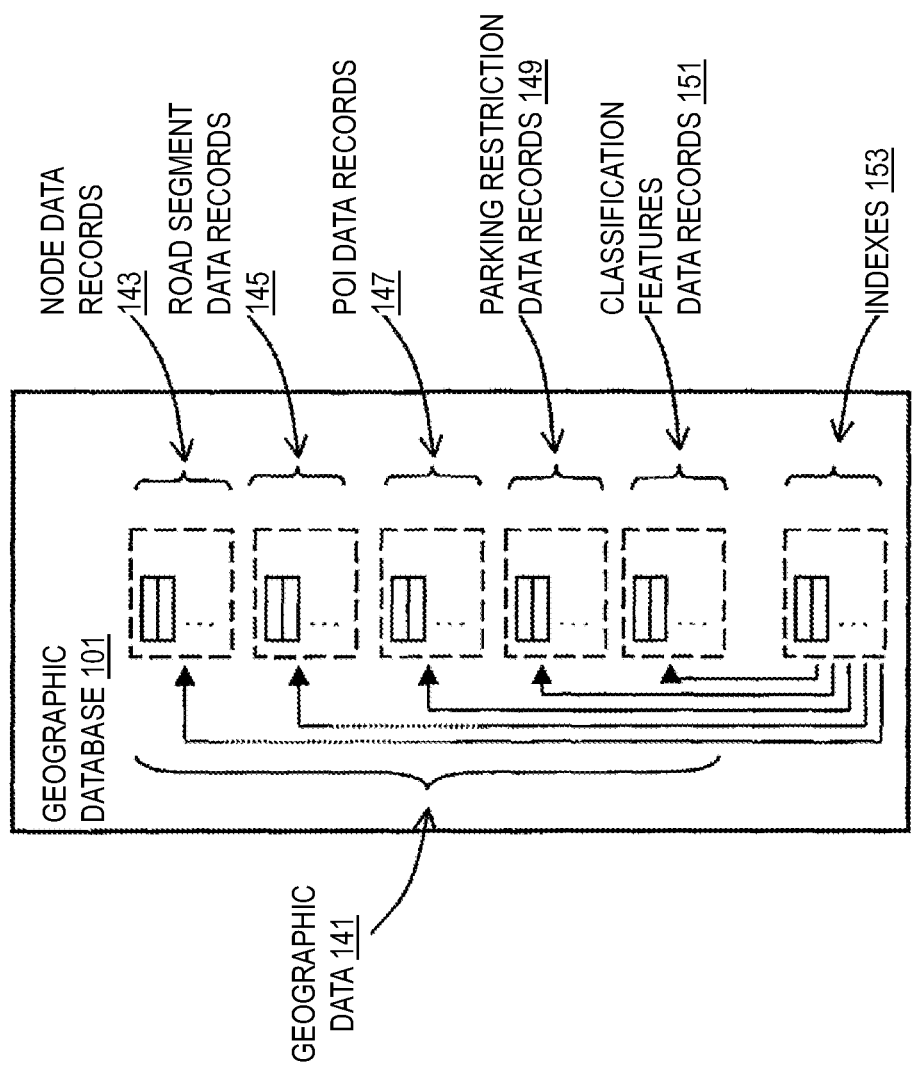
FIG. 1B is a diagram of a geographic database, according to one embodiment.

FIG. 1B is a diagram of the geographic database 101, according to one embodiment. In one embodiment, parking restriction data and/or any other information used or generated by the system 100 to determine the parking restriction data using machine learning can be stored, associated with, and/or linked to the geographic database 101 or data thereof. In one embodiment, the geographic or map database 101 includes geographic data 141 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 101 includes node data records 143, road segment or link data records 145, POI data records 147, parking restriction data records 149, classification features data records 151, indexes 153, and/or other data records (not shown) for example. More, fewer or different data records can be provided.

In one embodiment, the indexes 153 may improve the speed of data retrieval operations in the geographic database 101. In one embodiment, the indexes 153 may be used to quickly locate data without having to search every row in the geographic database 101 every time it is accessed. In one embodiment, the other data records (not shown) include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 147 may also include information on locations of traffic controls (e.g., stoplights, stop signs, crossings, etc.).

In exemplary embodiments, the road segment data records 145 are links or segments representing roads, streets, or paths, as can be used in the calculated route or recorded route information. In one embodiment, the road segment or link data records 145 also specify a functional class value for the respective road link. As described above, the functional class can be used as a classification feature for assigning parking restriction labels using machine learning. The node data records 143 are end points corresponding to the respective links or segments of the road segment data records 145. The road link data records 145 and the node data records 143 represent a road network, such as used by vehicles, cars, and/or other entities. Alternatively, the geographic database 101 can contain path segment and node data records or other data that represent pedestrian paths or areas in addition to or instead of the vehicle road record data, for example.

The road link and nodes can be associated with attributes, such as functional class, parking restriction data (e.g., a flag indicating whether parking restriction data is defined for a road link record), parking availability information, geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 101 can include data about the POIs and their respective locations in the POI data records 147. The geographic database 101 can also include data about places, such as cities, towns, or other communities, and other geographic features, such as bodies of water, mountain ranges, etc. Such place or feature data can be part of the POI data 147 or can be associated with POIs or POI data records 147 (such as a data point used for displaying or representing a position of a city).

In one embodiment, the parking restriction data records 149 can include parking restriction labels associated with corresponding road link data records 145. In one embodiment, the parking restriction labels can be manually determined (e.g., using the traditional processes described above) or automatically determined using various embodiments of the machine learning process for assigning parking restriction labels to road links based on classification features. In one embodiment, the system 100 can also store classification feature values determined for specific road links in the classification features data records 151. In this way, if different machine learning models are used the stored feature values can be fed into each model.

The geographic database 101 can be maintained by the content provider in association with the service platform 119 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database 101 or data in the master geographic database 101 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 101 can be a master geographic database, but in alternate embodiments, the geographic database 101 can represent a compiled navigation database that can be used in or with end user devices (e.g., vehicle 111, UE 113, etc.) to provide navigation-related functions. For example, the geographic database 101 can be used with the end user device 111 and/or 113 to provide an end user with navigation features as well as parking restriction data for specific road links of the geographic database 101. In such a case, the geographic database 101 can be downloaded or stored on the end user device (e.g., vehicle 111, UE 113, etc.), such as in applications 125, or the end user device 111 or 113 can access the geographic database 101 through a wireless or wired connection (such as via a server and/or the communication network 109), for example.

Figure 2:
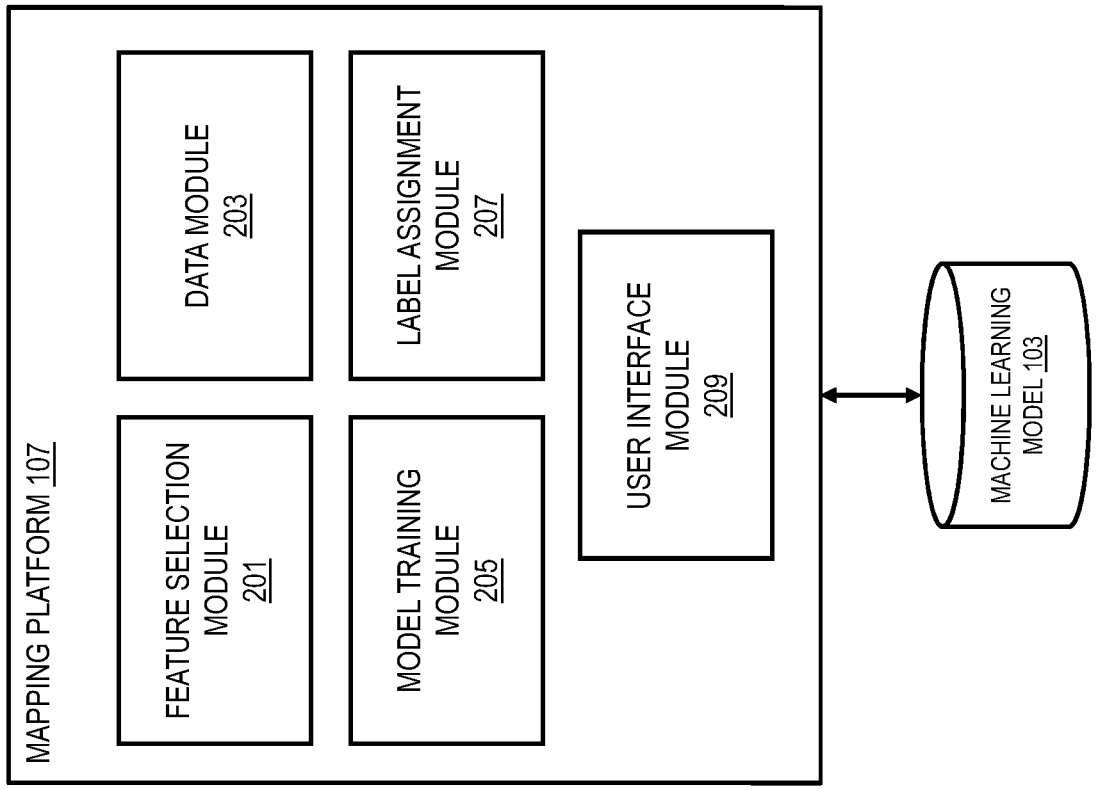
FIG. 2 is a diagram of the components of a mapping platform, according to one embodiment.

FIG. 2 is a diagram of the components of a mapping platform 107, according to one embodiment. By way of example, the mapping platform 107 includes one or more components for providing automated generation of parking restriction data using machine learning. It is contemplated that the functions of these components may be combined or performed by other components of equivalent functionality. In this embodiment, the mapping platform 107 includes a feature selection module 201, a data module 203, a model training module 205, a label assignment module 207, and a user interface module 209.

In one embodiment, the feature selection module 201 determines which set of classification features are to be used training the machine learning model 103 to assign parking restriction labels. As described above, classification features can include, but is not limited to: (1) functional class of a road link, (2) average historical parking availability per epoch, and (3) average number of epochs with historical parking availability. In one embodiment, to determine which classification features to use, the feature selection module 201 can evaluate whether the values for each candidate feature is sufficiently different (e.g., statistically significant, different beyond a threshold) for each corresponding parking restriction label.

Figure 3:
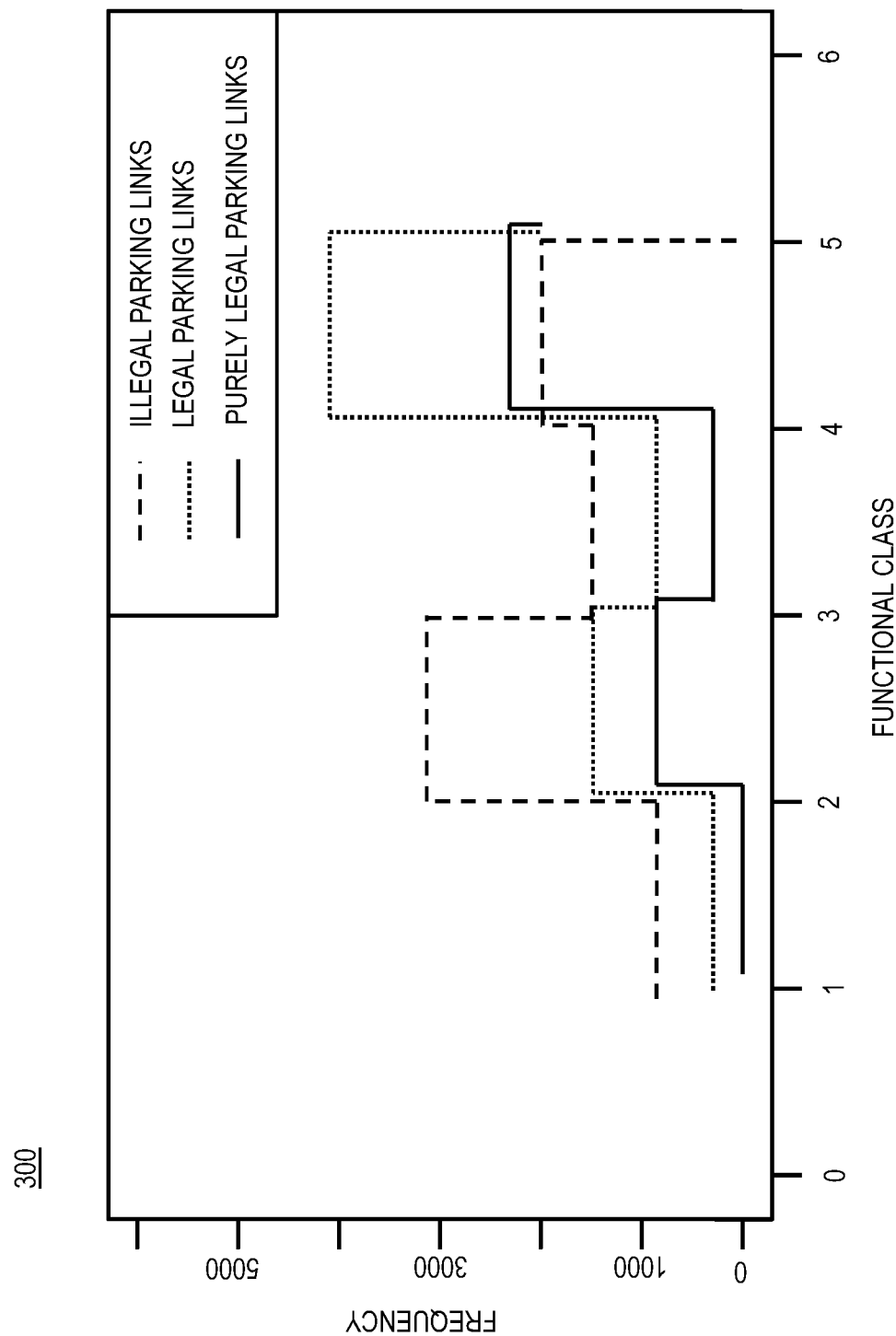
FIG. 3 is a graph illustrating an example frequency of parking restriction labels versus functional class, according to one embodiment.

For example, with respect to the functional class feature as shown a graph 300 of FIG. 3, the feature selection module 201 of FIG. 2 can determine a frequency of occurrence of a particular parking restriction label (e.g., illegal parking links, legal parking links, and purely parking links) versus functional class using road links with known or previously labeled parking restrictions. As shown, the resulting frequency distributions of the parking restriction labels versus functional class indicates that there is a different distribution for each parking restriction label. In particular, the graph 300 shows that illegal parking links generally have a higher functional class than legal and purely legal parking links. As a result, the feature selection module 201 can select the functional class feature to include in the set of classification features that are to be used for training the machine learning model 103.

Similarly, with respect to the historical parking availability feature, the feature selection module 201 can process probe trace data for road links with known or previously labeled parking restriction labels to determine whether the values can discriminate (e.g., are statistically different) between different parking restriction labels. As previously described, the historical parking availability is computed based on the number of probe traces that originate from a link (e.g., indicating a parking spot is available) and the number of probe traces that end at a link (e.g., indicating a parking spot is occupied) for a given time epoch. In on embodiment, parking availability can be assigned a non-zero number if the probe trace either starts from or ends at a link because in either case, it is assumed that some type of parking is available at that link if a probe starts or stops there.

Table 2 below illustrates an example of average historical parking availability per epoch determined for different parking restriction labels:

TABLE 2

| Parking Restriction Label | Average Historical Parking Availability |
|---|---|
| Illegal Parking Links | 0.0326 |
| Legal Parking Links | 0.1021 |
| Purely Legal Parking Links | 0.0887 |

In the example of Table 2, the computed average historical parking availability value for illegal parking links have approximately three times less availability than legal and purely parking links. This, for instance, indicates that the feature of average historical availability per epoch is meaningful for machine learning of street parking restrictions. Accordingly, the feature selection module 201 can select historical parking availability to include as a classification feature for training the machine learning model 103.

With respect to the feature of average number of epochs with known availability per link, the feature selection module 201 can perform a similar analysis using road links with known or previously labeled parking restriction labels. In one embodiment, known availability indicates that parking availability information has been defined for a road link (e.g., known to be 0 or otherwise) versus undefined (e.g., links where no parking availability information is available). For example, as noted above, if a probe trace is detected to be in a "park search mode" starts on a link, then parking availability for that link is greater than 0, likewise if the probe trace ends on a link. If the probe trace passes a link and did not stop, then it is assumed that the parking availability is 0. In either case (e.g., where parking is available or not available), it is considered that parking availability information is known for the link. Whether parking availability is known (i.e., known parking availability) is then determined for each time epoch for a road link, and then the number epochs in which parking availability is defined is counted.

Table 3 below illustrates an example of average number of epochs with known availability per link determined for different parking restriction labels:

TABLE 3

| Parking Restriction Label | Average Number of Epochs with Known Parking Availability |
|---|---|
| Illegal Parking Links | 34.61 |
| Legal Parking Links | 22.11 |
| Purely Legal Parking Links | 16.28 |

As shown in the example of Table 3, illegal parking links have many more epochs in which the parking availability is known. This likely is because, most illegal links are major roadways (e.g., highways) for which more probe trace data is available. Although most of the assigned parking availability for illegal links is 0 (e.g., because vehicles typically never start, i.e., unpark, or stop, i.e., park, on links of major roadways), a parking availability value of 0 is nonetheless considered to defined or known with the system 100. Accordingly, the feature selection module 201 can select number of epochs with known parking availability to include as a classification feature for training the machine learning model 103.

In one embodiment, the data module 203 collects and/or analyzes data from the geographic database 101, the probe database 105, and/or any other data repositories available over the communication network 109 to obtain values for classification features selected by the feature selection module 201. For example, the data module 203 can query the geographic database 101 for a functional class value for road links of interest. Similarly, the data module 203 can collect and/or analyze probe or trajectory data as stored in the probe database and/or generated by one or more the vehicle 111 or UE 113. For example, the data module 203 determines probe traces from the probe database 105 that originate from or terminate at road links of interest. The probe traces are then used to compute parking availability related features such as the historical parking availability and epochs with known parking availability.

In one embodiment, the data module 203 assembles a set of training data based on the selected classification. The training data, for instance, comprises a set of road links that have been assigned or labeled with parking restriction labels that are used as ground truth data for training. The data module 203 then retrieves or otherwise computes for the values for the classification features and incorporates those values into the training data. An example of a training data set is illustrated in Table 1 above, and can include data records specifying a ground truth parking restriction label for a link and the determined classification feature values for that link as fields of the data record. In one embodiment, the training data set can be divided into a training set for actually training the machine learning model 103, and a test/validation set for validating or determining an accuracy of the trained machine learning model 103.

In one embodiment, the model training module 205 uses the training data set (e.g., to initiate a training of the machine learning model 103 to assign parking restriction labels to unlabeled links. In one embodiment, depending on the type of machine learning model that is used (e.g., Bayes Net, Decision Tree, etc.), the model training module 205 can initiate a tuning of hyperparameters for the machine learning model 103 before training of the model 103 is performed. By way of example, a hyperparameter is a parameter of the machine learning model 103 that affects how machine learning algorithm itself (e.g., parameters related to avoiding overfitting of data by the model). Generally, hyperparameters cannot be learned directly from the training data in the standard model training process and need to be predefined. Examples of hyperparameters are regularization parameters such as a "C" parameter that determines the margin of separation for a classification hyperplane. For example, the "C" or regularization parameter can be varied to avoid misclassifying each training sample or alert. Other examples of hyperparameters include, but are not limited to: a training window duration, a number of leaves or depth of a tree, a learning rate, etc.

The model training module 205 can then initiate the training of the machine learning model 103 by feeding the known parking restrictions labels and classification features values of the training set into the model 103. As described above, in one embodiment, the model training module 205 can train a number of different machine learning models (e.g., Bayes Net, Decision Trees, Support Vector Machines, Neural Networks, etc.) with the training data. The model training model 205 can then evaluate the accuracy or other performance characteristics (e.g., true positive rates, false positive rates, specificity, etc.) to select a model to use as the machine learning model 103 for assign parking restriction labels.

In one embodiment, the label assignment module 207 can then use the trained machine learning model to assign labels to road links (e.g., previously unlabeled road links or road links for which new labels are to be assigned). For example, for each road link to be labeled, the label assignment module 207 interact with the data module 203 to determine respective values for the selected classification features (e.g., functional class, historical parking availability, number of epochs with known parking availability). The classification feature values are fed into the machine learning model 103 to output an assigned parking restriction classification for the link. The label assignment module 207 can then store the assigned parking restriction label as parking restriction data for the road link. For example, the road link data record 145 of the geographic database 101 for the link in question can be updated to specify the assigned parking restriction label.

In one embodiment, the label assignment module 207 can assign parking restriction labels to road links specified or input by a user or administrator. For example, the user may provide a list of road links that are to be labeled to the label assignment module 207. The module 107 can then initiate the labeling for the links on the list. In addition or alternatively, the label assignment module 207 can automatically query or determine which links in the geographic database 101 do not have defined parking restrictions labels, or whose labels have expired or were assigned more than a specified period of time ago. These links can then be automatically labeled with parking restriction labels according to the various embodiments described herein.

In one embodiment, the user interface module 209 can then present the newly labeled parking restriction data to an administrator of the geographic database 101. For example, the user interface may indicate which road links have been automatically labeled with parking restriction labels. The user interface can also provide options for the administrator to review and/or approve the automatically generated parking restriction labels. In yet another embodiment, the user interface can present information on which road links have defined parking restriction data (e.g., percent of links that have been labeled, whether the labeling is through manual or automatic means, etc.).

In one embodiment, the user interface module 209 can provide the automatically generated parking restriction data to support drivers in finding a parking space during routing or route planning. For example, the user interface module 209 can initiate a presentation of an end user interface at the vehicle 111 and/or UE 113, wherein the end user interface depicts representations (e.g., visual representation, audio representation, etc.) of the parking restriction data for road links of interest to the end user (e.g., road links on a planned navigation routed). It is further noted that the user interface module 211 may operate over the communication network 109 to facilitate the exchange of parking restriction data with the service platform 119, services 121, content providers 123, and/or applications 125.

The above presented modules and components of the mapping platform 107 can be implemented in hardware, firmware, software, or a combination thereof. Though depicted as a separate entity in FIG. 1A, it is contemplated that the mapping platform 107 may be implemented as a module of any of the components of the system 100. In another embodiment, one or more of the modules 201-209 may be implemented as a cloud based service, local service, native application, or combination thereof.

Figure 10:
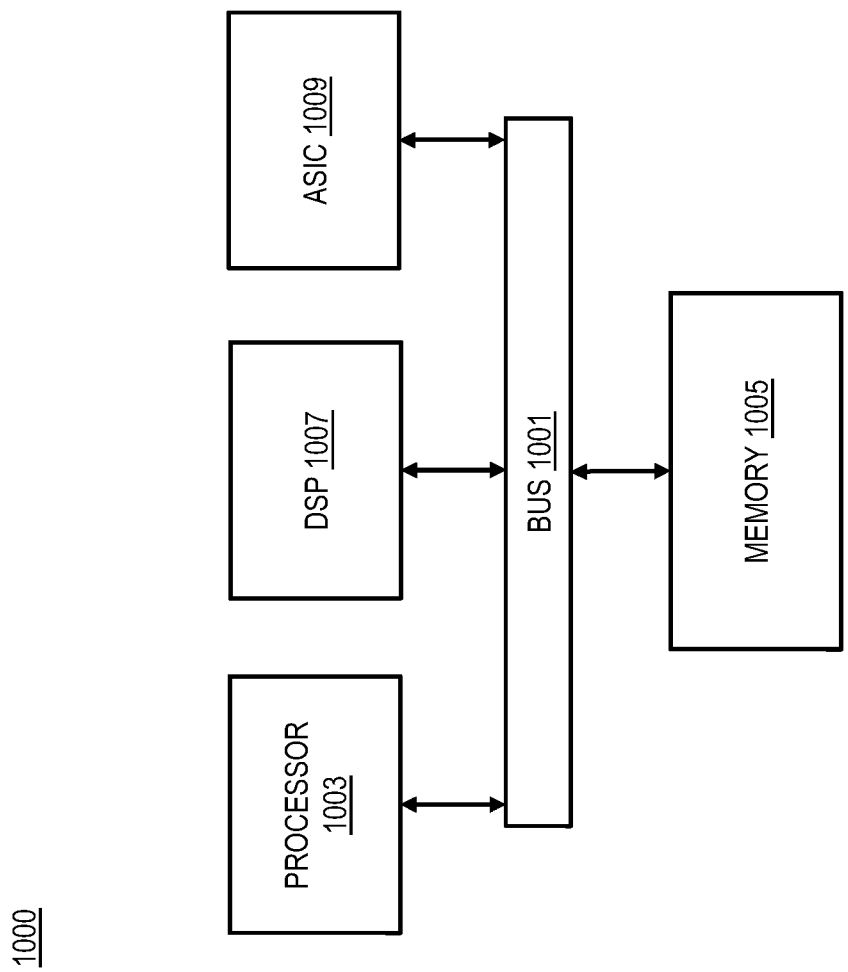
FIG. 10 is a diagram of a chip set that can be used to implement an embodiment of the invention.

FIG. 3 is a graph illustrating an example frequency of parking restriction labels versus functional class, according to one embodiment. In various embodiments, the mapping platform 107 may perform one or more portions of the process 300 and may be implemented in, for instance, a chip set including a processor and a memory as shown in FIG. 10. As such, the mapping platform 107 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

Figure 4:
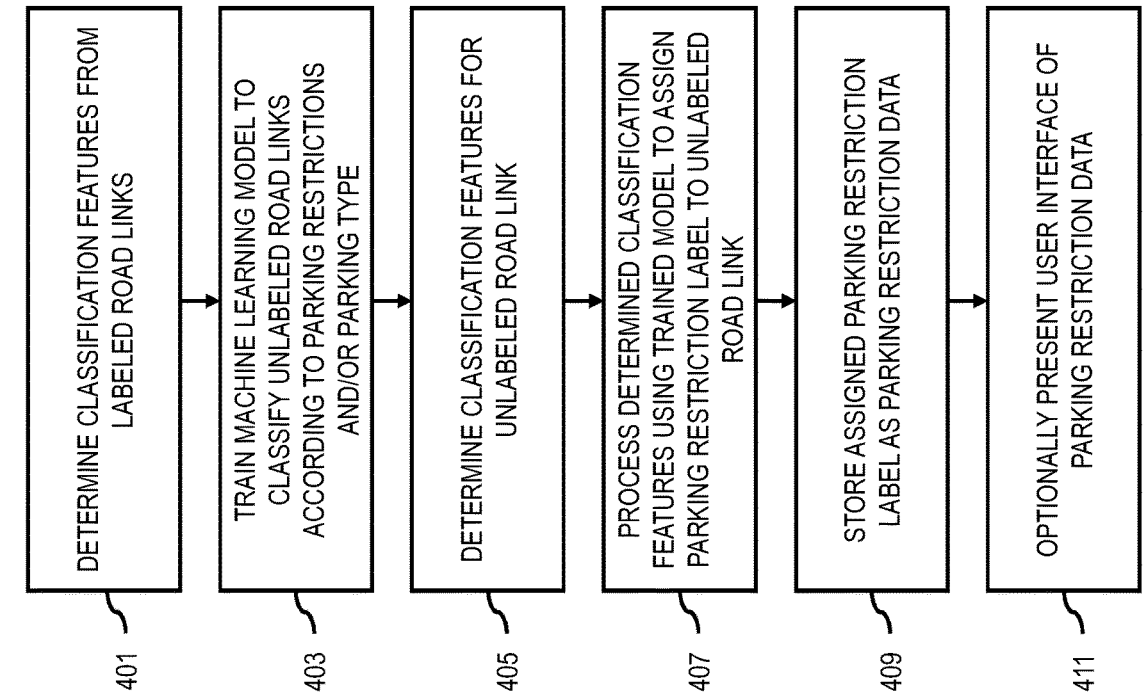
FIG. 4 is a flowchart of a process for using a machine learning model to assign parking restriction labels to road links, according to one embodiment.

FIG. 4 is a flowchart of a process for using a machine learning model to assign parking restriction labels to road links, according to one embodiment. In various embodiments, the mapping platform 107 may perform one or more portions of the process 400 and may be implemented in, for instance, a chip set including a processor and a memory as shown in FIG. 10. As such, the mapping platform 107 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the mapping platform 107 identifies a plurality of classification features associated with a set of labeled road links. In other words, the mapping platform 107 can identify what set of classification features are available for the set of labeled road links data and selects which classification features from among available classification features to use for training the model learning model 103 (e.g., see the description of the feature selection module 201 of FIG. 2 above). The classification features (e.g., both selected and available classification features) are related to assigning parking restriction labels to a set of other road links. In one embodiment, the plurality of classification features includes a functional class of a road link, a historical parking availability at the road link, an average number of time epochs with parking availability at the road link, or a combination thereof. These classification features are provided only as examples and not as limitations. Accordingly, the mapping platform 107 can use any other classification feature. For example, the plurality of classification features can further include characteristics of a point of interest, density of roads, population density, speed limits, zoning as residential, commercial, public use, industrial, or mixed-use regions near a road link.

In one embodiment, each of the labeled road links is labeled with a parking restriction label that indicates a parking restriction status of said each of the labeled road links. In one embodiment, the parking restriction label or the assigned parking restriction label includes at least one of a legal parking label indicating that the parking restriction status is legal for at least one time period, an illegal parking label indicating that the parking restriction status is illegal (e.g., illegal at all times on the link), and a purely legal parking label indicating that parking is always legal (e.g., legal at all times on the link).

In one embodiment, the mapping platform 107 can also classify or assign parking restriction labels that are sub-types of a higher level parking restriction label. For example, the mapping platform 107 can assign different sub-labels or subtypes under the legal parking label. In other words, the mapping platform 107 can have several different subtype labels grouped under each of the parking labels (e.g., legal, illegal, and purely legal). In one embodiment, the parking subtype labels include at least one of a free parking label indicating that the parking is legal and has no cost, a permitted parking label indicating that the parking is legal and a parking permit is required, and a paid parking label indicating that the parking is legal and a payment for the parking is required.

In step 403, the mapping platform 107 trains the machine learning model to classify an unlabeled road link of the geographic database using the plurality of classification features and the set of labeled road links. As previously described, the set of labeled road links are designated as a training data that represents ground truths with respect to parking restriction labels. For example, each record in the training set can include a field indicating the ground truth parking label and fields indicating values for the respective classification features selected to train the machine learning model. In one embodiment, the set of labeled road links are a first portion of a plurality of stored road links in the geographic database that have been manually labeled with the parking restriction label, and the unlabeled road link is included within a second portion of the plurality of stored road links in the geographic database that is not labeled with the parking restriction label. In one embodiment, the training data set can be further split into a training set (e.g., for training the model) and a validation set (e.g., for validating or characterizing an accuracy of the trained model). In one embodiment, the machine learning model can be retrained periodically as new manually labeled or new ground truth data for parking restrictions are obtained.

In step 405, to initiate labeling of road links, the mapping platform 107 determines the plurality of classification features for the unlabeled road link. For example, the plurality of classification features are the same features used to train the machine learning model as described with respect to step 401. Then, the mapping platform 107 can use processes such as those described below with respect to FIG. 5 to determine these classification features for each unlabeled road link. In many cases, how the values of the classification features are obtained (e.g., by querying a database, calculating from probe trace data, directly sensing via device sensors, etc.) can be dependent on each respective classification feature.

In step 407, the mapping platform 107 processes the classification features determined for each unlabeled road link using the trained machine learning model to associate an assigned parking restriction label to the unlabeled road link. For example, input data records that specify an unlabeled road link and its determined classification feature values can be fed into the machine learning model to output an assigned parking restriction label.

In step 409, the mapping platform 107 stores the assigned parking restriction label as the parking restriction data. As noted above, the newly assigned parking restriction labels can be automatically generated and stored in the geographic database 101 or any other database designated as a parking restrictions database.

In step 411, the mapping platform 107 optionally presents the assigned parking restriction label in a user interface for managing the geographic database. In addition or alternatively, the mapping platform 107 can present a representation of the assigned parking restriction label in a mapping user interface of a user device. Examples of such user interfaces are described in more detail with respect to FIGS. 7 and 8 below.

Figure 5:
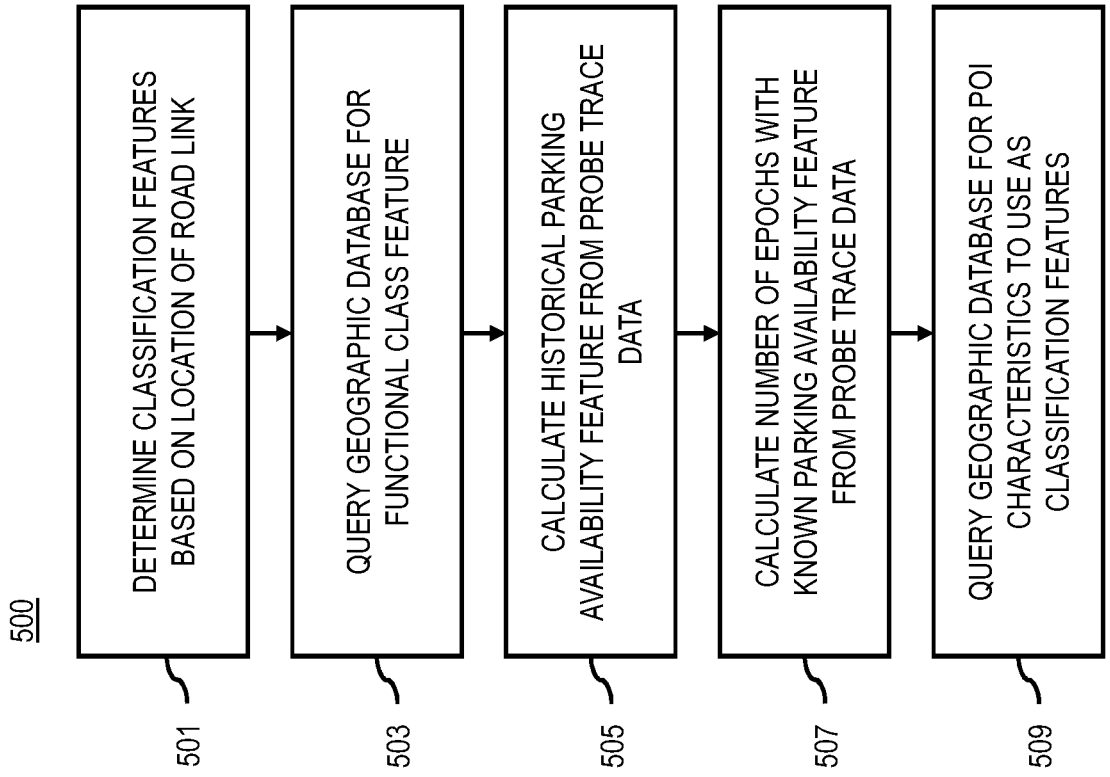
FIG. 5 is a flowchart of a process for determining classification features for a machine learning model configured to assign parking restriction labels to road links, according to one embodiment.

FIG. 5 is a flowchart of a process for determining classification features for a machine learning model configured to assign parking restriction labels to road links, according to one embodiment. In various embodiments, the mapping platform 107 may perform one or more portions of the process 500 and may be implemented in, for instance, a chip set including a processor and a memory as shown in FIG. 10. As such, the mapping platform 107 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps. In one embodiment, the processes of FIG. 5 are optional processes that can be performed in conjunction with the process 400 of FIG. 4.

In step 501, the mapping platform 107 determines which features to include in the plurality of classification features based on a respective location of said each of the labeled road links or the unlabeled road links. As described above, in some embodiments, the classification feature set comprises functional class, historical parking availability, number of epochs with known parking availability, as well as any other features that may have correlation with parking restriction labels. In one embodiment, the mapping platform 107 can determine which classification feature set to use for model training and link labeling based on the location of the road links to label. In other words, different sets of classification features (e.g., drawn from the available set) can be used depending on location. For example, different regions or countries may have different types of road or transportation networks where different classification features may be more important. Even within the same country or region, different classification features can be used for urban areas versus rural areas. In this way, the mapping platform 107 can advantageously vary the classification to optimize model training and labeling accuracy.

In one embodiment, the mapping platform 107 can determine the classification features for the unlabeled road links using any means known in the art. For example, in step 503, determining classification features for the road links includes querying a geographic database for a functional class of said each of the labeled road links, the unlabeled road link, or a combination thereof. In one embodiment, at least one of the plurality of classification features is a functional class feature corresponding to the functional class.

In one embodiment, determining respective values includes determining probe trace data originating from or terminating at said each of the labeled road links or the unlabeled road link. The mapping platform 107 then calculates a historical parking availability value based on the determined probe trace data (step 505). The mapping platform 107 can also determine the probe trace data and the historical parking availability value with respect to a plurality of time epochs. In this case, the historical parking availability value is an average across the plurality of time epochs. In one embodiment, at least one of the plurality of classification features is a historical parking availability feature corresponding to the historical parking availability value.

In one embodiment, at least one of the plurality of classification features corresponds to a number of the plurality of time epochs for which parking availability information is known for said each of the plurality of labeled road links or the unlabeled road link (step 507). For example, when determining the historical parking availability value as described at step 505, the mapping platform 107 can count the number of time epochs for a given road link that parking availability information is defined. In one embodiment, the count is used to represent the value for this classification feature. As previously described, parking availability information can be defined as long as some value (e.g., 0 or otherwise) is specified for a given road link at a given time epoch. If no value is defined or computed (e.g., because no probe trace data are available at a given time epoch for a given road link), then the parking availability information is designated as unknown to the mapping platform 107, and therefore, not included in the count or value for the classification feature.

In one embodiment, the mapping platform 107 can query the geographic database 101 for point-of-interest characteristics to use as classification features (step 509). In other words, the plurality of classification features includes one or more characteristics of a point of interest proximate to said each of the labeled road links or the unlabeled road link. As previously described, the mapping platform 107 can also query the geographic database 101 and/or any other database accessible over the communication network 109 to determine other potential classification features such as density of roads, population density, speed limits, zoning information (e.g., residential, commercial, public use, industrial, mixed-used, etc.), and/or the like near the road links of interest.

Figure 6:
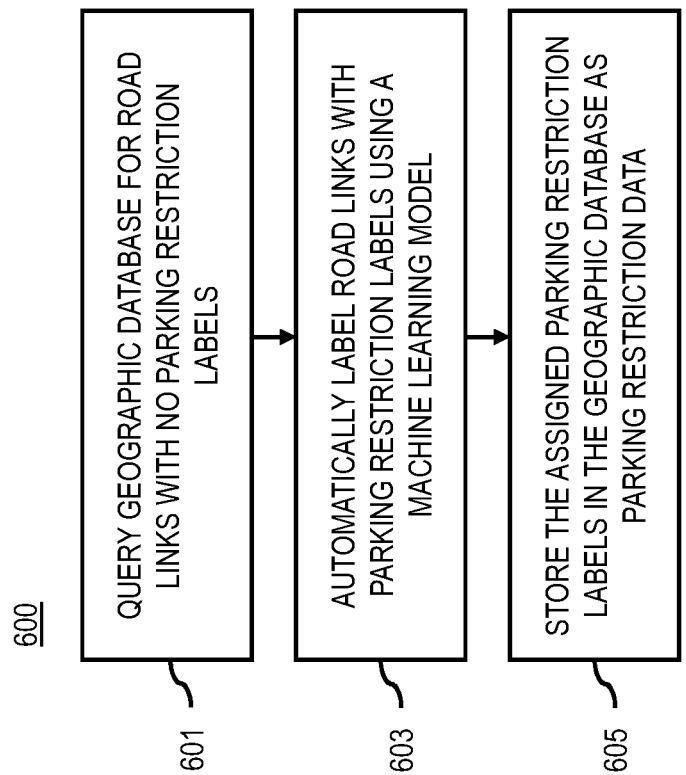
FIG. 6 is a flowchart of a process for automatically labeling road links with parking restriction labels, according to one embodiment.

FIG. 6 is a flowchart of a process for automatically labeling road links with parking restriction labels, according to one embodiment. In various embodiments, the mapping platform 107 may perform one or more portions of the process 600 and may be implemented in, for instance, a chip set including a processor and a memory as shown in FIG. 10. As such, the mapping platform 107 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In one use case, the mapping platform 107 can be used to automatically assign parking restriction labels to road links in the geographic database 101 that otherwise would have undefined parking restriction data. As noted above, the resource intensive manual method that has been traditionally used has resulted in many geographic databases having parking restriction data for only a fraction of stored road links. Accordingly, in step 601, the mapping platform 107 queries a geographic database for a set of road links that are unlabeled with respect to a parking restriction label.

In step 603, the mapping platform 107 automatically labels the set of road links with a respectively assigned parking restriction label using a machine learning model as discussed with respect to the various embodiments described herein. For example, the machine learning model is trained to classify the set of road links using a plurality of classification features determined from another set of road links that were previously labeled with a known parking restriction label.

In step 605, the mapping platform 107 stores the respectively assigned parking restriction label in the geographic database as the parking restriction data. As described above, the respectively assigned parking restriction label or the known parking restriction label includes at least one of a legal parking label indicating that the parking restriction status is legal for at least one time period, an illegal parking label indicating that the parking restriction status is illegal, and a purely legal parking label indicating that parking is always legal.

Figure 7:
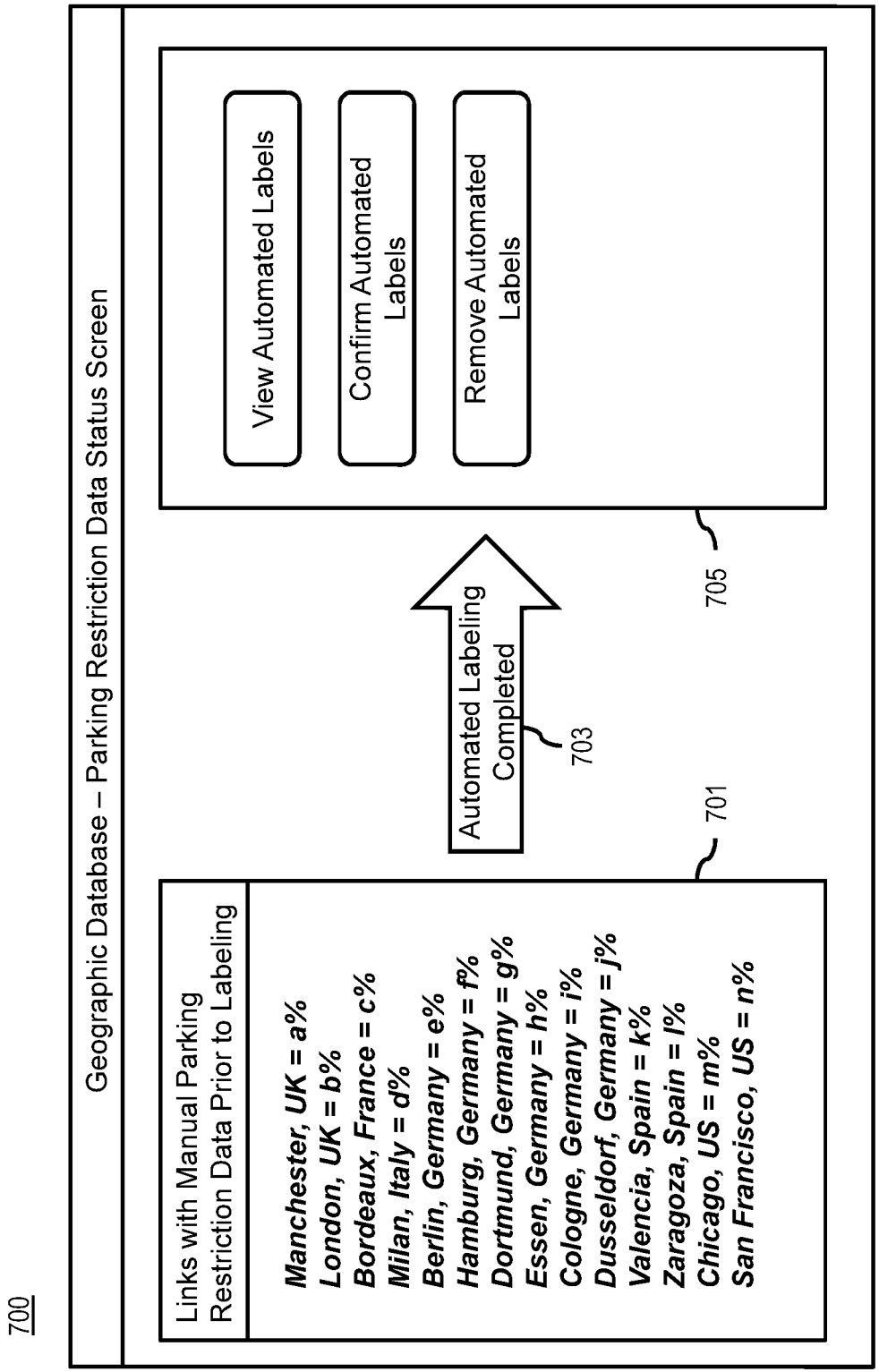
FIG. 7 is a diagram of a user interface for managing parking restriction data in a geographic database, according to one embodiment.

FIG. 7 is a diagram of a user interface for managing parking restriction data in a geographic database, according to one embodiment. As shown in FIG. 7, the mapping platform can present a user interface (UI) 700 to, for instance, an administrator of the geographic database 101.

For example, the UI 700 presents a database management screen related to managing parking restriction data for road links stored in the geographic database 101. A window 701 is presented to show the percentage of the road links stored in the geographic database 101 that have been manually label with parking restriction labels. The percent labeled information is shown by city with respective percentages for each city in the database. The percentage values are represented from a %-n %, which can range from 0% to 100% depending on completeness of the database. In this way, the UI 700 can indicate to the administrator a labeling status for each city. For those cities with incomplete labeling percentages (e.g., <100% or some other criteria), the administrator can initiate embodiments of automated labeling processes described herein.

In this example, the administrator has selected to perform automated labeling of parking restriction data using machine learning to bring the geographic database to 100% labeled for each of the cities. The automated assignment of parking restriction labels is performed as described in the various embodiments described herein. In this case, the labeled portion of the geographic database 101 can be used to train the machine learning model 103 to perform the parking restriction labeling. In one embodiment, the machine learning model 103 can be trained independently for each listed city (e.g., different classification features can be selected for each different city depending on which features or combination of features result in higher labeling accuracy). As shown, when the automated labeling is complete, an indicator 703 is presented along with a window 705 presenting options for viewing the automatically assigned labels, confirming the automatically assigned labels, and/or removing the automatically assigned labels. It is noted that these label management functions are provided by way of illustration and not limitation. Any or none of these options may be presented depending on the configuration of the system 100. In addition, any other management operations (e.g., editing, re-training of the machine learning model 103, etc.) may be provided in the UI 700.

Figure 8:
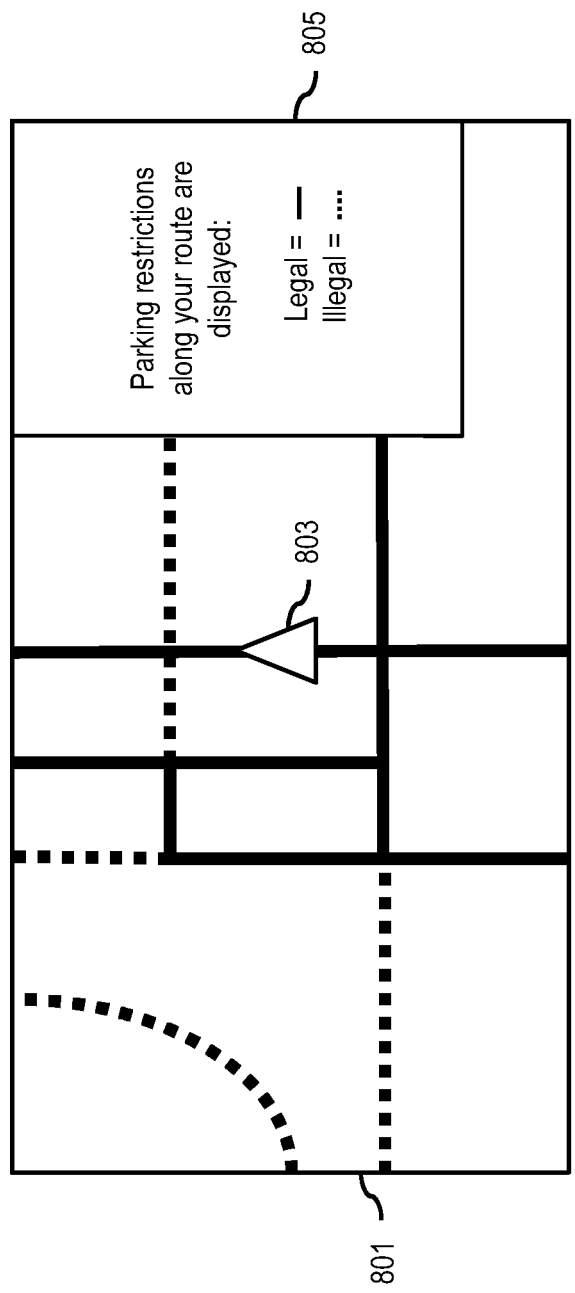
FIG. 8 is a diagram of a mapping user interface presenting visual representations of parking restriction data generated from machine learning, according to one embodiment.

FIG. 8 is a diagram of a mapping user interface presenting visual representations of parking restriction data generated from machine learning, according to one embodiment. As shown, a UI 801 depicts a navigation user interface (e.g., presented on vehicle 111 and/or UE 113) for a user traveling in a road network. The UI 801 presents a representation of a current user position 803 overlaid on a map display of the road network. As indicated in window 805, the map display presents representations of parking restriction status with respect to road links of the road network. In this example, road links with legal parking is indicated by a solid line, and road links on which parking is illegal is indicated with a dotted line. In one embodiment, the labeling of the displayed road links is performed using the various embodiments of the machine learning processes described herein.

In addition, the vehicle 111 and/or UE 113 presenting the UE 901 can also act as a probe for gathering update-to-date probe traces to support future updates to the automatically assigned parking restriction labels. For example, the vehicle 111 and/or UE 113 can periodically record and report (e.g., to the mapping platform 107) probe points as it travels the network. If the vehicle 111 and/or UE 113 parks on a road link previously labeled as illegal, the probe trace data will end at the road link and give and additional data point that can be used to retrain the machine learning model 103 or to update the assigned parking restriction label for that link.

The processes described herein for providing automated generation of parking restriction data using machine learning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
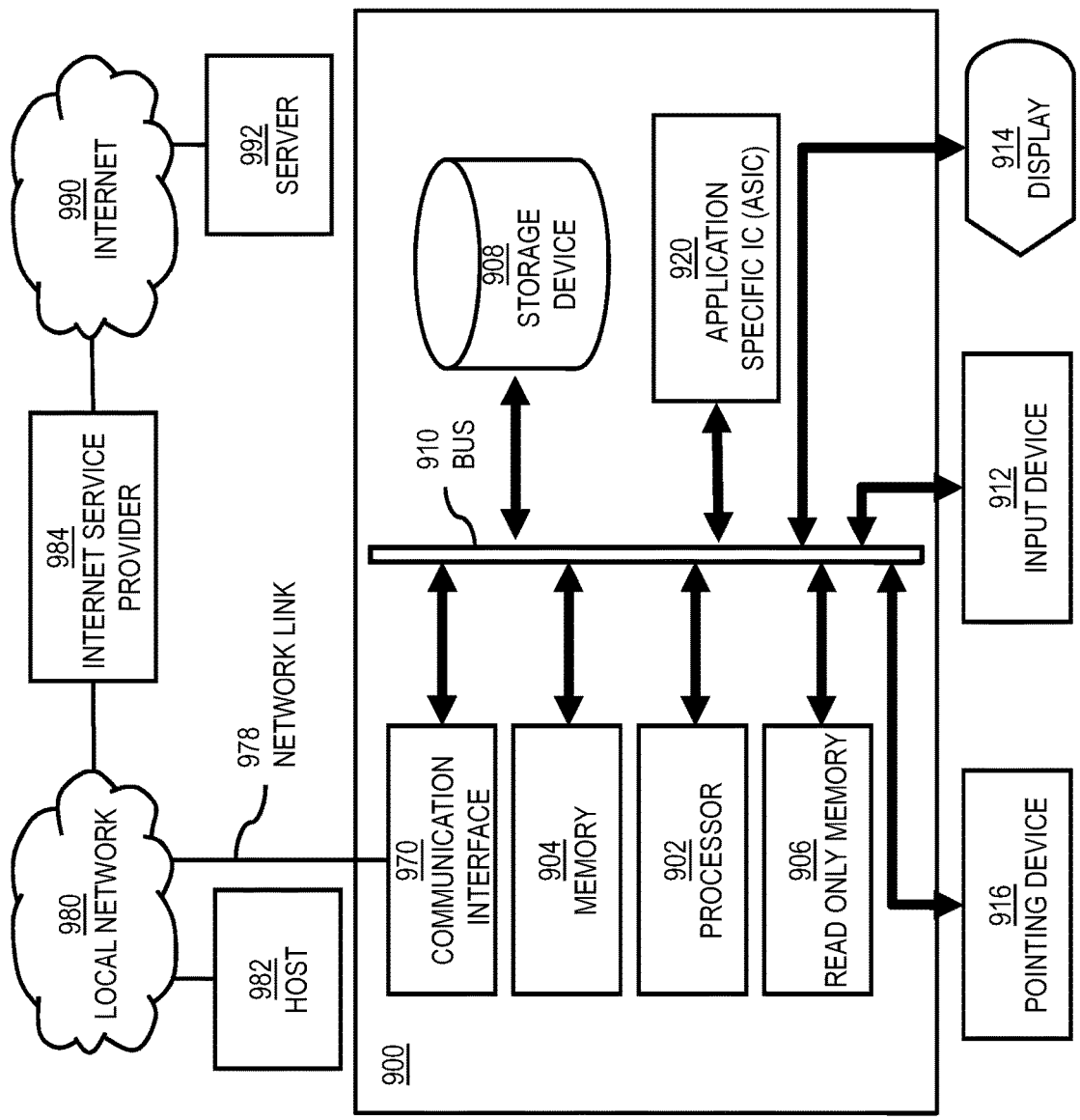
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide automated generation of parking restriction data using machine learning as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing automated generation of parking restriction data using machine learning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing automated generation of parking restriction data using machine learning. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing automated generation of parking restriction data using machine learning, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. Network link 978 may provide a connection through local network 980 to a host computer 982 or to equipment operated by an Internet Service Provider (ISP) 984. ISP equipment in turn provides data communication services through Internet 990. A server 992 connected to the Internet 990 that provides a service in response to information received over the Internet. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for providing automated generation of parking restriction data using machine learning.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide automated generation of parking restriction data using machine learning as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide automated generation of parking restriction data using machine learning. The memory 1005 also stores the data associated with or generated by the execution of the inventive steps.

Figure 11:
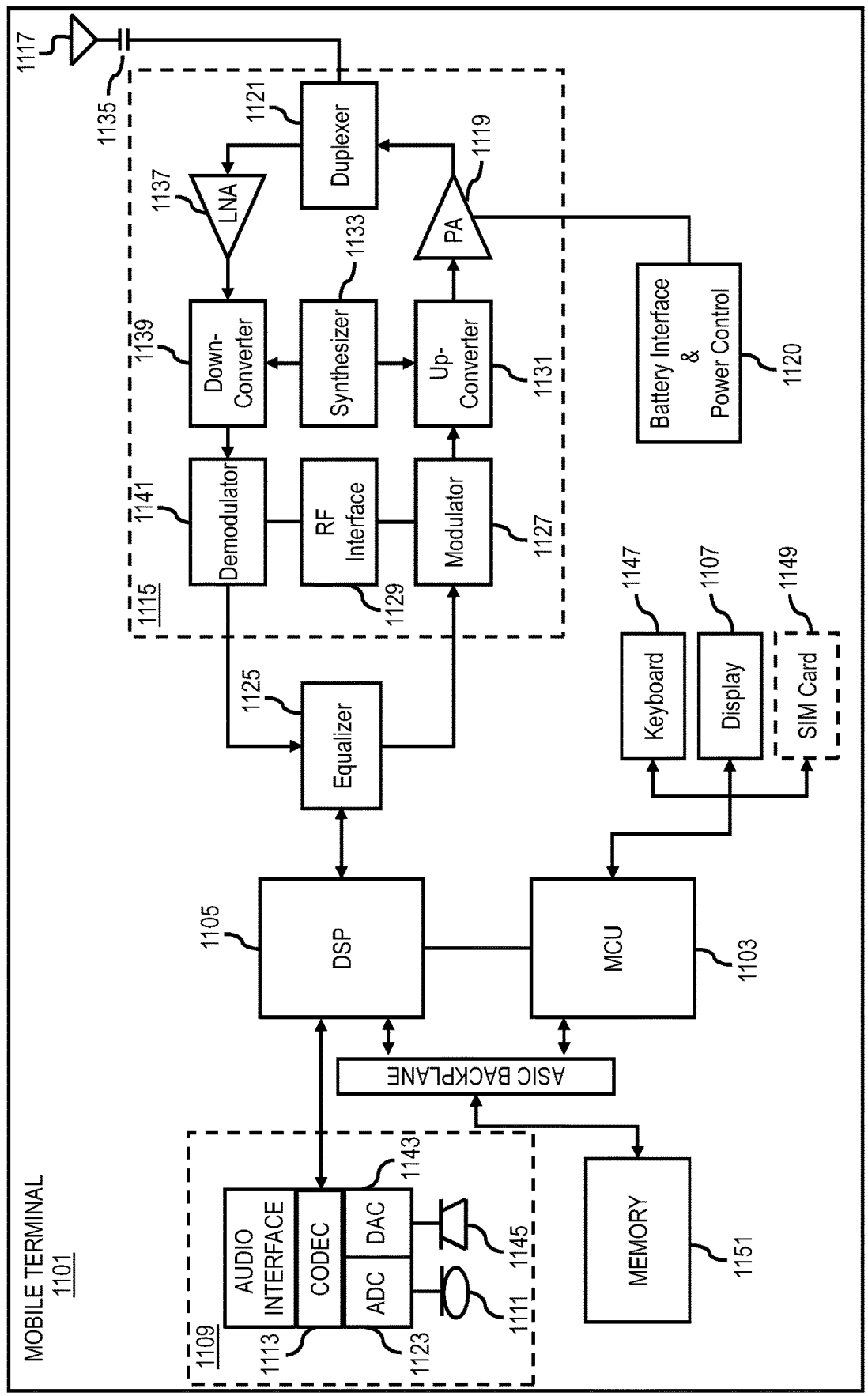
FIG. 11 is a diagram of a mobile terminal (e.g., mobile computer) that can be used to implement an embodiment of the invention.

FIG. 11 is a diagram of exemplary components of a mobile station 1101 (e.g., handset or vehicle) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide automated generation of parking restriction data using machine learning. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating parking restriction data using a machine learning model, comprising:
    determining a plurality of classification features associated with a set of labeled road links, wherein each of the labeled road links is labeled with a parking restriction label that indicates a parking restriction status of said each of the labeled road links;
    training a plurality of machine learning models;
    selecting the machine learning model with the highest accuracy among the machine learning models to classify an unlabeled road link of a geographic database using the plurality of classification features;
    determining the plurality of classification features for the unlabeled road link, wherein the plurality of classification features include an average number of time epochs with parking availability at a respective road link;
    processing the plurality of classification features for the unlabeled road link using the trained machine learning model to associate an assigned parking restriction label to the unlabeled road link; and
    storing the assigned parking restriction label as the parking restriction data,
    wherein which features to include in the plurality of classification features is based on a respective location of said each of the labeled road links or the unlabeled road link.

2. The method of claim 1, wherein the parking restriction label or the assigned parking restriction label includes at least one of a legal parking label indicating that the parking restriction status is legal for at least one time epoch, an illegal parking label indicating that the parking restriction status is illegal, and a purely legal parking label indicating that parking is always legal, and the method further comprising:
    dividing a time period equally into a plurality of time epochs including the time epochs; and
    classifying a road link labeled as illegal parking when a respective average number of time epochs with parking availability is significantly higher than a respective average number of time epochs with parking availability of a road link labeled as legal parking.

3. The method of claim 1, wherein the determining of the plurality of classification features comprises querying the geographic database for a functional class feature of said each of the labeled road links, the unlabeled road link, or a combination thereof as at least one of the plurality of classification features, and wherein the functional class feature includes principal arterial, minor arterial, collector, local, or a combination thereof.

4. The method of claim 1, wherein the determining of the plurality of classification features comprises:
    determining probe trace data originating from or terminating at said each of the labeled road links or the unlabeled road link;
    calculating a historical parking availability feature based on the determined probe trace data; and
    classifying a road link labeled as illegal parking when a respective historical parking availability feature per epoch is significantly lower than a respective historical parking availability feature per epoch of a road link labeled as legal parking.

5. The method of claim 4, further comprising:
    determining the probe trace data and the historical parking availability feature with respect to a plurality of time epochs.

6. The method of claim 5, wherein the historical parking availability feature is an average across the plurality of time epochs, and the method further comprising:
    classifying a road link labeled as illegal parking when a respective averaged historical parking availability feature per epoch is significantly lower than a respective averaged historical parking availability feature per epoch of a road link labeled as legal parking.

7. The method of claim 1, further comprising:
    cross validating the trained machine learning models against another set of labeled road links,
    wherein at least one of the plurality of classification features corresponds to a number of the plurality of time epochs for which parking availability information is known for said each of the plurality of labeled road links or the unlabeled road link.

8. The method of claim 1, further comprising:
    applying a multiple-fold cross validation on the trained machine learning models based on the set of labeled road links and another set of labeled road links,
    wherein the set of labeled road links are a first portion of a plurality of stored road links in the geographic database that have been manually labeled with the parking restriction label, and the unlabeled road link is included within a second portion of the plurality of stored road links in the geographic database that is not labeled with the parking restriction label.

9. The method of claim 1, further comprising:
    determining the accuracy for each of the trained machine learning models based on a set of road links with ground truth parking restriction labels; and
    presenting the assigned parking restriction label in a user interface for managing the geographic database.

10. The method of claim 1, further comprising:
presenting a representation of the assigned parking restriction label in a mapping user interface of a user device,
wherein the accuracy is measured based on a true positive rate, a false positive rate, a precision, a recall, an F-score, or a combination thereof.

11. An apparatus for generating parking restriction data using a machine learning model, comprising:
at least one processor; and
at least one memory including computer program code for one or more programs,
the at least one memory and the computer program code configured to, with the at least one processor, cause the apparatus to perform at least the following,
determine a plurality of classification features associated with a set of labeled road links, wherein each of the labeled road links is labeled with a parking subtype label indicating a subtype of the parking;
train a plurality of machine learning models;
select the machine learning model with the highest accuracy among the machine learning models to classify an unlabeled road link of a geographic database using the plurality of classification features, wherein the unlabeled road link is unlabeled at least with respect to the parking subtype label;
determine the plurality of classification features for the unlabeled road link, wherein the plurality of classification features include an average number of time epochs with parking availability at a respective road link;
process the plurality of classification feature for the unlabeled road link using the trained machine learning model to associate an assigned parking subtype label to the unlabeled road link; and
store the assigned parking subtype label as the parking restriction data,
wherein which features to include in the plurality of classification features is based on a respective location of said each of the labeled road links or the unlabeled road link.

12. The apparatus of claim 11, wherein the parking subtype label or the assigned parking subtype label includes at least one of a free parking label indicating that the parking is legal and has no cost, a permitted parking label indicating that the parking is legal and a parking permit is required, and a paid parking label indicating that the parking is legal and a payment for the parking is required.

13. The apparatus of claim 11, wherein the plurality of classification features includes a functional class of said each of the labeled road links or the unlabeled road link.

14. The apparatus of claim 11, wherein the determining of the plurality of classification features comprises:
process probe trace data collated across a plurality of time epochs to determine a historical parking availability feature, a number of epochs with known parking availability feature, or a combination thereof as at least one of the plurality of classification features.

15. The apparatus of claim 11, wherein the plurality of classification features includes one or more characteristics of a point of interest proximate to said each of the labeled road links or the unlabeled road link.

16. A non-transitory computer-readable storage medium for generating parking restriction data using a machine learning model, carrying one or more sequences of one or more instructions which, when executed by one or more processors, cause an apparatus to at least perform the following steps:
querying a geographic database for a set of road links that are unlabeled with respect to a parking restriction label;
training a plurality of machine learning models to classify the set of road links using a plurality of classification features determined from another set of road links that were previously labeled with a known parking restriction label, wherein the plurality of classification features include an average number of time epochs with parking availability at a respective road link;
selecting the machine learning model with the highest accuracy among the machine learning models;
automatically labeling the set of road links with a respectively assigned parking restriction label using the machine learning model; and
storing the respectively assigned parking restriction label in the geographic database as the parking restriction data,
wherein which features to include in the plurality of classification features is based on a respective location of said each of the labeled road links or the unlabeled road link.

17. The non-transitory computer-readable storage medium of claim 16, wherein the respectively assigned parking restriction label or the known parking restriction label includes at least one of a legal parking label indicating that the parking restriction status is legal for at least one time epoch, an illegal parking label indicating that the parking restriction status is illegal, and a purely legal parking label indicating that parking is always legal.

18. The non-transitory computer-readable storage medium of claim 16, wherein the plurality of classification features includes a functional class of a road link, a historical parking availability at the road link, or a combination thereof.

19. The non-transitory computer-readable storage medium of claim 16, wherein the apparatus is further caused to perform:
presenting the respectively assigned parking restriction label in a user interface for managing the geographic database.

* * * * *